(12) United States Patent
Chih

(10) Patent No.: US 6,260,543 B1
(45) Date of Patent: Jul. 17, 2001

(54) FUEL DELIVERY MODULE WITH INTEGRATED FILTER

(75) Inventor: Ming-Niu Chih, dearborn hgts., MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/574,776

(22) Filed: May 19, 2000

(51) Int. Cl.[7] .................................................. F02M 37/04
(52) U.S. Cl. ......................... 123/509; 123/510; 137/574
(58) Field of Search .................... 123/509, 510, 123/514, 516; 137/574, 576

(56) References Cited

U.S. PATENT DOCUMENTS

| | | | |
|---|---|---|---|
| 4,750,522 | * 6/1988 | Griffin et al. | 137/895 |
| 4,860,714 | * 8/1989 | Bucci | 123/514 |
| 4,974,570 | 12/1990 | Szwargulski et al. | 123/509 |
| 5,070,849 | 12/1991 | Rich et al. | 123/509 |
| 5,195,494 | * 3/1993 | Tuckey | 123/514 |
| 5,218,942 | 6/1993 | Coha et al. | 123/514 |
| 5,289,810 | * 3/1994 | Bauer et al. | 123/510 |
| 5,339,785 | 8/1994 | Wilksch | 123/457 |
| 5,341,842 | 8/1994 | Chih et al. | 137/574 |
| 5,363,827 | 11/1994 | Siekmann | 123/509 |
| 5,642,719 | 7/1997 | Brown | 123/509 |
| 5,649,514 | * 7/1997 | Okada et al. | 123/514 |
| 5,692,479 | 12/1997 | Ford et al. | 123/514 |
| 5,699,773 | * 12/1997 | Kleppner et al. | 123/510 |
| 5,762,049 | * 6/1998 | Jones et al. | 123/514 |
| 5,785,032 | * 7/1998 | Yamashita et al. | 123/509 |
| 5,791,317 | * 8/1998 | Eck | 123/510 |
| 5,794,597 | * 8/1998 | Schwegler et al. | 123/514 |

* cited by examiner

*Primary Examiner*—Carl S. Miller
(74) *Attorney, Agent, or Firm*—Mark L. Mollon

(57) ABSTRACT

A fuel delivery module with an integrated fuel filter is disclosed. The fuel delivery module can be mounted in a fuel tank for supplying fuel from the fuel tank to an engine. The fuel delivery module includes a fuel reservoir, a sealed main fuel filter housing, a fuel pump, a pressure regulator, and a jet pump. The main fuel filter housing is mounted to the fuel reservoir and defines a main fuel filter chamber that contains a main fuel filter. The fuel pump is located within the fuel reservoir for pumping fuel from the fuel reservoir through a fuel pump outlet conduit and into the main fuel filter chamber. A filter housing outlet conduit is provided for routing fuel from the main fuel filter chamber to the engine. The pressure regulator is in fluid communication with the main fuel filter chamber and a jet pump fuel inlet conduit for routing a portion of fuel from the main fuel filter chamber and to the jet pump fuel inlet conduit when a threshold pressure is reached in the main fuel filter chamber. The jet pump has a fuel intake chamber in fluid communication with the jet pump fuel inlet conduit for receiving fuel from the main fuel filter chamber and for routing the fuel past a venturi opening to draw fuel from the fuel tank through an inlet orifice in a wall of the fuel reservoir into a jet pump fuel outlet chamber and through a jet pump outlet conduit into the fuel reservoir. The jet pump outlet conduit includes a one-way valve which allows fuel flow from the jet pump outlet conduit into the fuel reservoir while preventing fuel flow from the fuel reservoir into the jet pump outlet conduit. The fuel delivery module maintains a minimum level of fuel in the fuel reservoir to provide a continuous source of fuel to the fuel pump when the fuel tank fuel level is low or when vehicle operations, such as cornering, braking, acceleration, or slope parking, would cause the fuel tank fuel level to fall below the inlet of the fuel pump.

20 Claims, 7 Drawing Sheets

FUEL DELIVERY MODULE WITH INTEGRATED FILTER

BACKGROUND OF THE INVENTION

1. Field of the Invention

This invention relates to engine fuel supply systems having a fuel pump located in a fuel tank, and more particularly to a fuel delivery module that is located in a fuel tank for maintaining a sufficient level of fuel at the inlet of the fuel pump when the fuel tank fuel level is low or when vehicle operations cause the fuel tank fuel level to fall below the inlet of the fuel pump.

2. Description of the Related Art

Fuel tanks, particularly in automobiles, typically contain a fuel pump to supply fuel from the fuel tank to the engine. Generally, the fuel pump is mounted near the bottom of the fuel tank so that the inlet of the fuel pump is as near as possible to the lowest level in the tank so that a source of fuel will be available even when fuel level is low. Despite such a placement of the fuel pump inlet, events during vehicle operation, such as cornering, braking and acceleration can cause the fuel to "slosh" around, potentially uncovering the fuel pump inlet. Driving or parking on a slope could similarly result in the fuel pump inlet being uncovered. When the inlet is exposed, the fuel pump sucks air (or fuel vapor) causing the engine to stammer and stall. An additional problem occurs at engine start-up when fuel tank level is low and there is insufficient fuel at the pump inlet.

One solution to the above mentioned problems has been to place in the fuel tank a fuel reservoir that is replenished with fuel from the fuel tank and can provide fuel to the inlet of a fuel pump under certain operating conditions. For example, U.S. Pat. Nos. 5,341,842, 5,218,942 and 5,070,849 disclose modular fuel delivery systems wherein a portion of pressurized fuel from a fuel pump is routed to a jet pump that is used to entrain fuel from the fuel tank into a fuel reservoir to keep the fuel reservoir full of fuel in order to provide a source of fuel to the fuel pump at all times; U.S. Pat. No. 4,974,570 discloses a fuel supply system that includes a valve for conveying fuel from a reserve container to the fuel pump when a float valve in the tank closes due to a low level of fuel in the tank; and U.S. Pat. Nos. 5,642,719 and 5,363,827 disclose engine fuel systems wherein a fuel pump is located within a reserve fuel container that receives fuel from an engine return fuel line, and wherein a float operated valve opens a fluid path between the fuel pump and the reserve container when the fuel tank is near empty.

While each of the fuel supply systems disclosed in these patents may provide a solution to the aforementioned problems associated with a low fuel level in a fuel tank, they all have one significant disadvantage. Specifically, these systems all require the use of an engine fuel return line and therefore, are not generally suitable for use with a fuel injection system having only one fuel pipe leading between the fuel tank and the fuel injectors at the engine. These systems are conventionally known as "returnless" fuel systems, and an example of such a system can be found in U.S. Pat. No. 5,339,785.

In view of the increasing use of "returnless" fuel systems and the aforementioned problems with known fuel supply systems, there have been developments in fuel supply systems that include a fuel tank, a fuel reservoir in the fuel tank, a fuel pump in the fuel reservoir and a single fuel line for delivering fuel to an engine. For example, U.S. Pat. No. 5,692,479 discloses a returnless fuel delivery system that includes a fuel tank, a reservoir located within the fuel tank, and a fuel pump within the reservoir for pumping fuel to the engine via a single fuel line. The returnless fuel delivery system also includes a pressure regulator having an inlet port in fluid communication with the fuel pump, a first outlet port in fluid communication with the fuel line, and a second outlet port for returning excess low pressure fuel to the fuel reservoir. The system also includes a jet pump located between the second outlet port of the pressure regulator and the fuel reservoir. The excess fuel from the pressure regulator enters the jet pump and pressure is created at an orifice of the jet pump such that fuel is entrained from the fuel tank. The combined fuel (fuel from the jet pump and fuel entrained from the fuel tank) is then routed to the fuel reservoir.

While the fuel delivery system disclosed in U.S. Pat. No. 5,692,479 provides an advance in the field of modular fuel delivery systems for returnless fuel delivery systems, it does have certain disadvantages. For instance, the arrangement of the pressure regulator, the fuel filter and the jet pump in the fuel delivery system does not provide for ease of installation as the fuel filter is external to the fuel tank and the pressure regulator and the jet pump are external to the fuel reservoir.

Thus, there is a need for a fuel delivery module that can be located in a fuel tank for maintaining a sufficient level of fuel at the inlet of a fuel pump, that can be used with returnless fuel delivery systems, and that provides for an integrated arrangement of components such that the fuel delivery module can be installed in a fuel tank and placed in fluid communication with a single fuel line to an engine.

SUMMARY OF THE INVENTION

The foregoing disadvantages of prior art fuel delivery systems are overcome by providing a fuel delivery module in accordance with the present invention that can be mounted in a fuel tank for supplying fuel from the fuel tank to an engine. The fuel delivery module includes a fuel reservoir, a sealed main fuel filter housing, a fuel pump, a pressure regulator, and a jet pump. The main fuel filter housing is mounted to the fuel reservoir and defines a main fuel filter chamber that contains a main fuel filter. The fuel pump is located within the fuel reservoir for pumping fuel from the fuel reservoir through a fuel pump outlet conduit and into the main fuel filter chamber. A filter housing outlet conduit is provided for routing fuel from the main fuel filter chamber to the engine. The pressure regulator is in fluid communication with the main fuel filter chamber and a jet pump fuel inlet conduit for routing a portion of fuel from the main fuel filter chamber and to the jet pump fuel inlet conduit when a threshold pressure is reached in the main fuel filter chamber. The jet pump has a fuel intake chamber in fluid communication with the jet pump fuel inlet conduit for receiving fuel from the main fuel filter chamber and routing the fuel past a venturi opening to draw fuel from the fuel tank through an inlet orifice in a wall of the fuel reservoir into a jet pump fuel outlet chamber and through a jet pump outlet conduit into the fuel reservoir. The jet pump outlet conduit includes a one-way valve which allows fuel flow from the jet pump outlet conduit into the fuel reservoir while preventing fuel flow from the fuel reservoir into the jet pump outlet conduit.

In one preferred version of the fuel delivery module, the main fuel filter housing includes a filter body mounted in an upwardly facing opening in the fuel reservoir, and a filter cover for sealing an upwardly facing opening in the filter body. Together, the filter body and the filter cover define the main fuel filter chamber. In this preferred version, the fuel delivery module includes an upper flange for sealingly engaging an opening in a top wall of the fuel tank. The upper flange is connected to the filter cover, and a biasing means that engages the upper flange and the filter cover is provided for biasing the fuel reservoir against a bottom wall of the fuel tank. This preferred version of the fuel delivery module also includes an electrical connector mounted in the upper flange for supplying power to a fuel level sender attached to the filter cover and to the fuel pump. There is also provided a fuel pump filter attached to an inlet of the fuel pump.

One advantage of the present invention is that the fuel delivery module contains a fuel pump, a main fuel filter, a jet pump and associated components for maintaining a high minimum level of fuel in a fuel reservoir to provide a continuous source of fuel to the fuel pump when the tank fuel level is low or when vehicle operations, such as cornering, braking or acceleration, would cause the tank fuel level to fall below the fuel pump inlet.

Another advantage of the present invention is that the fuel delivery module includes a pressure regulator so that the fuel delivery module can be used with returnless fuel delivery systems.

Still another advantage of the present invention is that the fuel delivery module contains modular and integrally molded components for easier and more economical manufacture and assembly.

Yet another advantage of the present invention is that the fuel delivery module can accommodate itself to expansion or contraction of the walls of a fuel tank.

A further advantage of the present invention is that the fuel delivery module provides an integrated arrangement of components such that the fuel delivery module can be installed in a fuel tank and placed in fluid communication with a single fuel line to an engine.

Still another advantage of the present invention is that the fuel delivery module includes the main fuel filter thereby reducing the cost of the system.

BRIEF DESCRIPTION OF THE DRAWINGS

These and other features, aspects, objects, and advantages of the present invention will become better understood upon consideration of the following detailed description, appended claims and accompanying drawings where:

Figure 1:
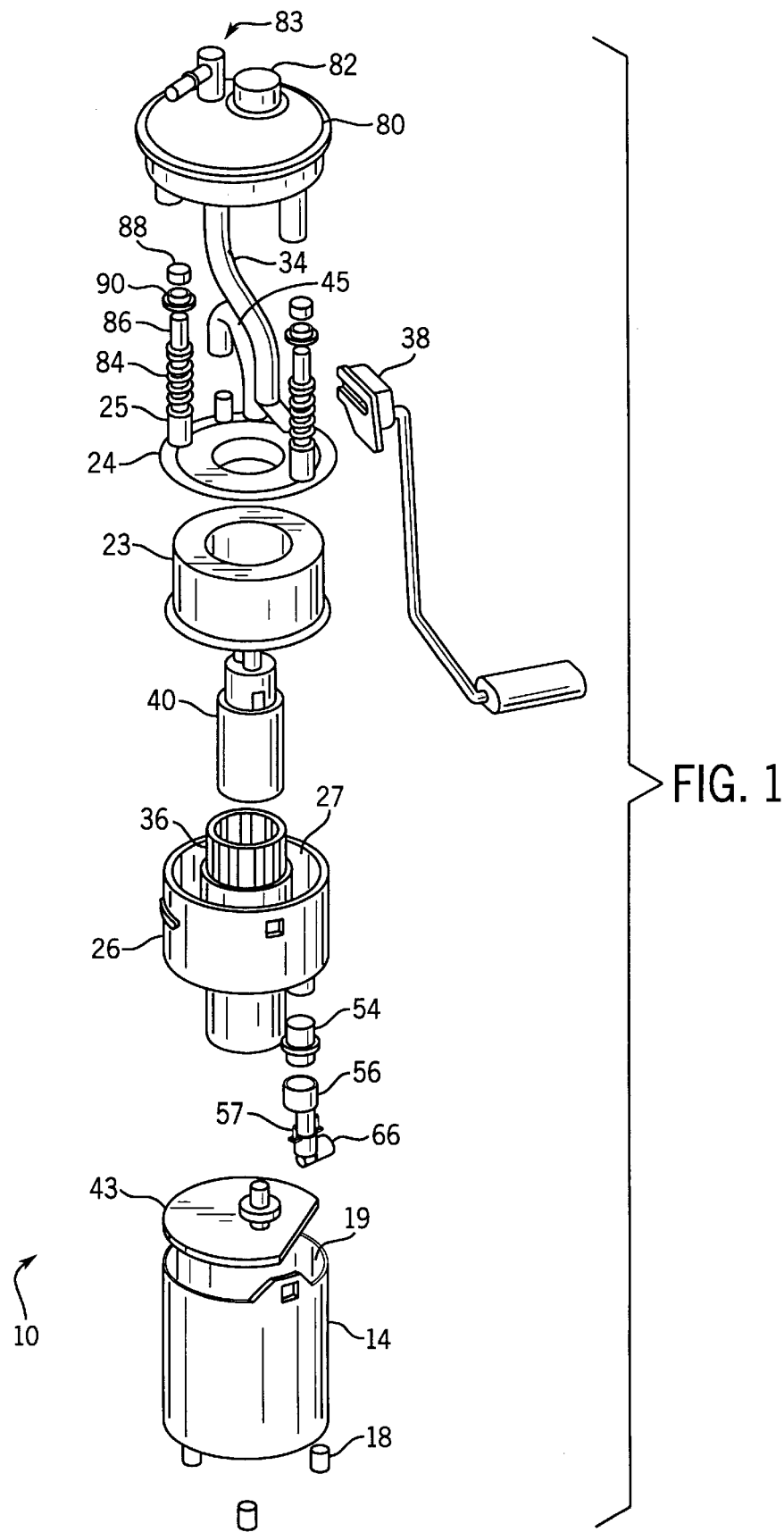
FIG. 1 is an exploded perspective view of a fuel delivery module according to the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DETAILED DESCRIPTION OF THE INVENTION

Referring to FIG. 1, the components of a fuel delivery module 10 in accordance with the present invention are shown. The fuel delivery module 10 includes, among other things, a fuel reservoir 14, a main fuel filter body 26 and a main fuel filter cover 24 that form a main fuel filter housing including a main fuel filter 23, a fuel pump 40, a pressure regulator 54, and a jet pump 66.

Figure 2:
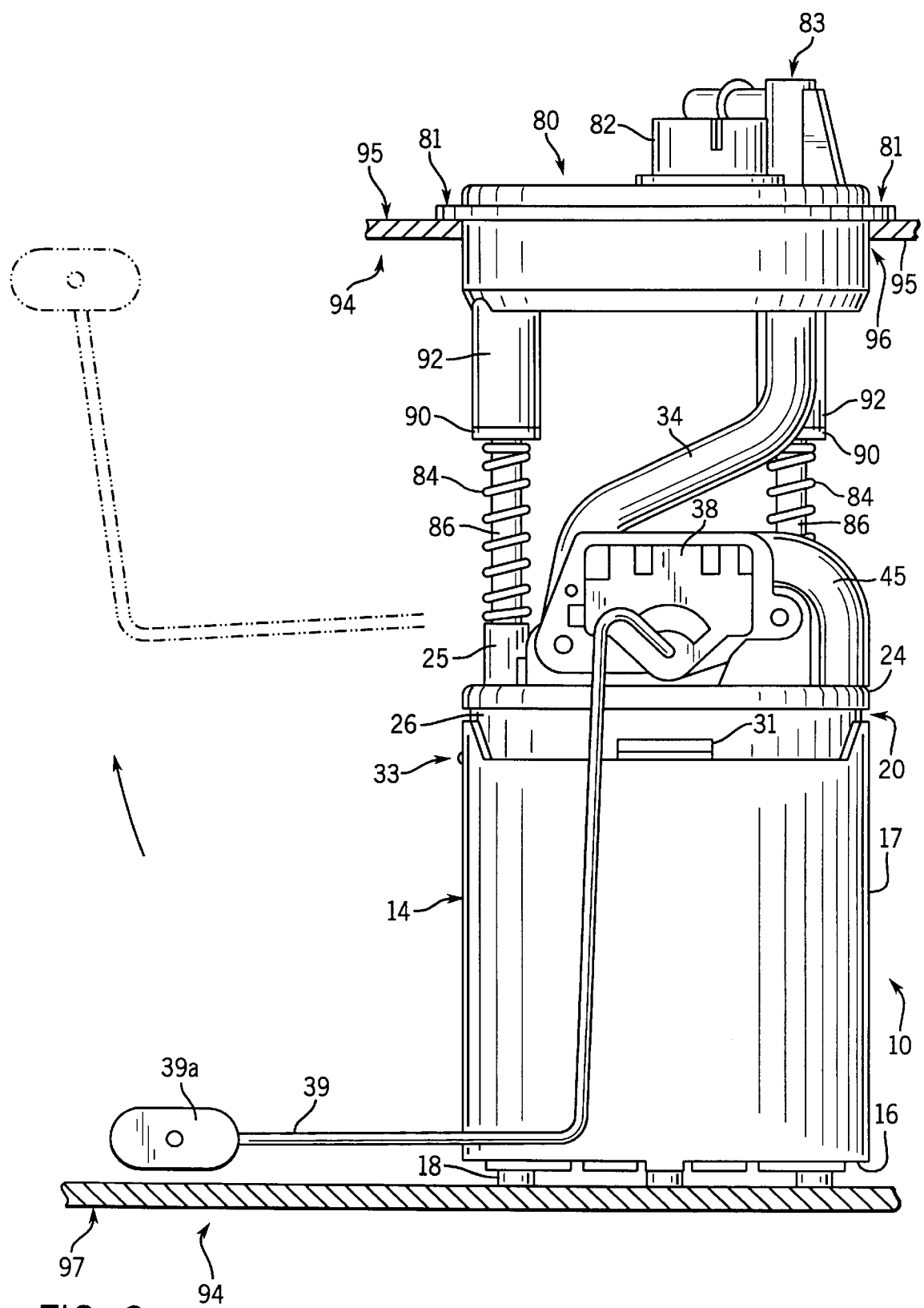
FIG. 2 is a front view of a fuel delivery module according to the present invention.

Looking at FIGS. 1 and 2, it can be seen that the fuel reservoir 14 has a cylindrical shape, and is preferably made of plastic. The fuel reservoir 14 has a bottom wall 16 and a circular side wall 17 that extends upwardly from the bottom wall 16. The side wall 17 defines a circular upwardly facing opening 19 in the fuel reservoir 14. Attached to the bottom wall 16 of the fuel reservoir 14 are feet 18, which are preferably made of a fuel resistant rubber such fluorosilicone. The feet 18 rest on a bottom wall 97 of a fuel tank 94 as shown in FIG. 2.

Figure 3:
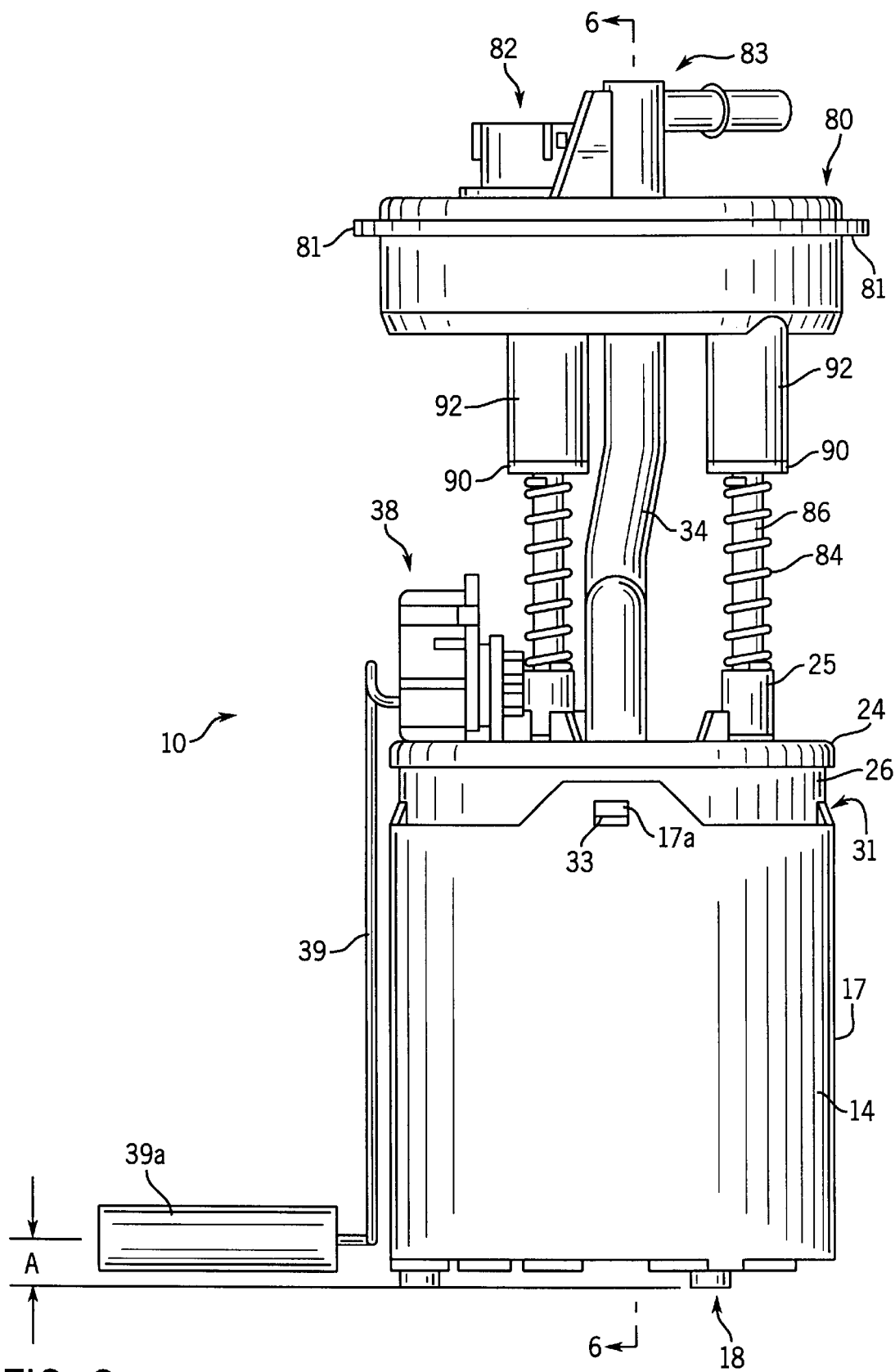
FIG. 3 is a side view of a fuel delivery module according to the present invention.
Figure 6:
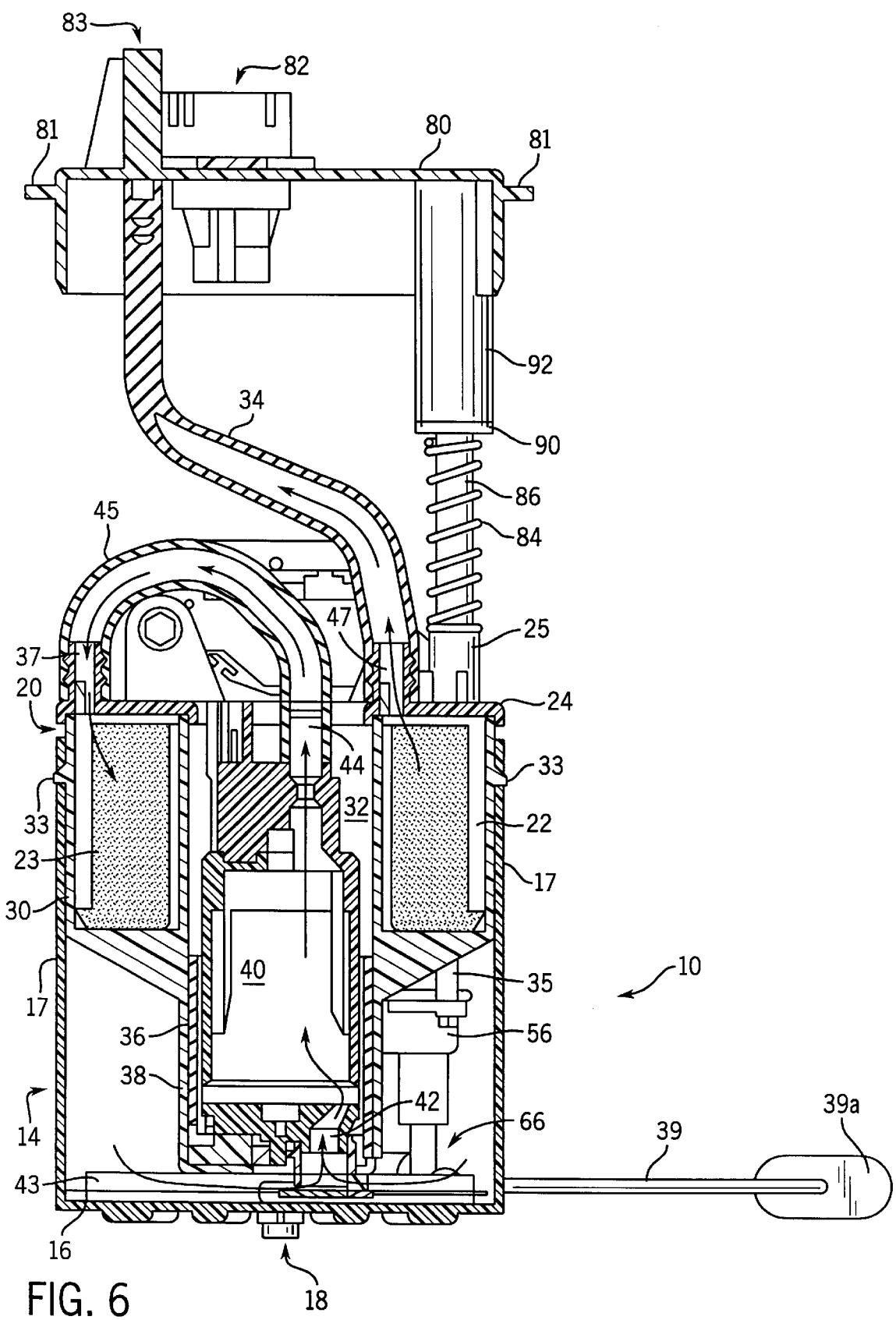
FIG. 6 is a sectional view of the fuel delivery module taken along line 6—6 of FIG. 3.

Turning to FIGS. 2, 3, 6 and 8, the main fuel filter housing 20 comprises the main fuel filter body 26 and the main fuel filter cover 24. The main fuel filter body 26 has a central tubular section 28 and a transverse wall 29 that extends outwardly from the tubular section 28. The main fuel filter body 26 also has a circular side wall 30 that extends upwardly from the transverse wall 29. The side wall 30 defines an annular upwardly facing opening 27 in the main fuel filter body 26 (see FIG. 1). The side wall 30 of the main fuel filter body 26 has outwardly extending flanges 31 on opposite sides of the side wall 30, and outwardly extending protrusions 33 on opposite sides of the side wall 30. The outwardly extending flanges 31 rest on an upper edge of the side wall 17 of the fuel reservoir 14 when the main fuel filter body 26 is mounted in the circular upwardly facing opening 19 in the fuel reservoir 14 as shown in FIGS. 2 and 3. The outwardly extending protrusions 33 of the main fuel filter body 26 are inserted in slots 17a in the side wall 17 of the fuel reservoir 14 when the main fuel filter body 26 is mounted in the circular upwardly facing opening 19 in the fuel reservoir 14 as shown in FIGS. 2 and 3. The annular main fuel filter cover 24 is used to cover the annular upwardly facing opening 27 in the main fuel filter body 26 to define a sealed main fuel filter chamber 22, which contains the annular main fuel filter 23. The main fuel filter cover 24 includes an inlet port 37 and an outlet port 47 which define fluid passageways into the main fuel filter chamber 22 as shown in FIG. 6.

As best shown in FIG. 2, a conventional fuel level sender unit 38 for sensing fuel level in the fuel tank 94 is attached to main fuel filter cover 24. The fuel level sender 38 includes a float arm 39 with a float 39a that is fixedly mounted on its end. The fuel level sender 38 transmits electrical information to a fuel level display by a sender wire (not shown). Looking at FIGS. 2 and 3, it can be seen that the float arm 39 of the fuel level sender 38 can travel between a lower position wherein the center of the float 39a is a distance 'A' above the fuel tank floor (FIG. 3) and an upper position (shown in phantom in FIG. 2) wherein the fuel level is at its highest point.

Figure 4:
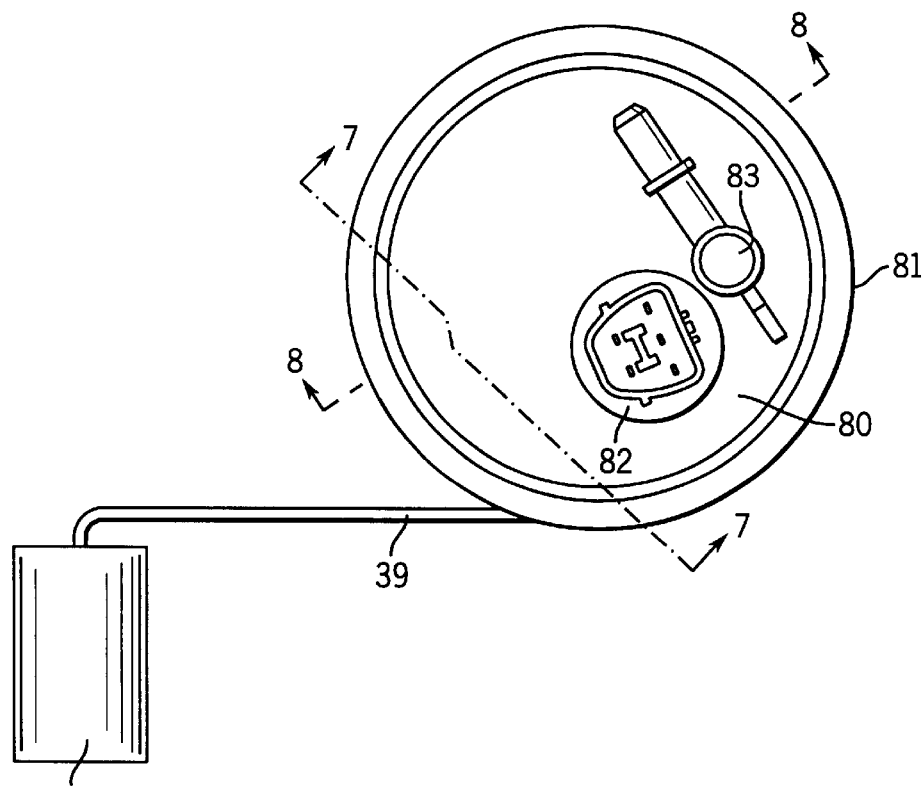
FIG. 4 is a top view of a fuel delivery module according to the present invention.
Figure 5:
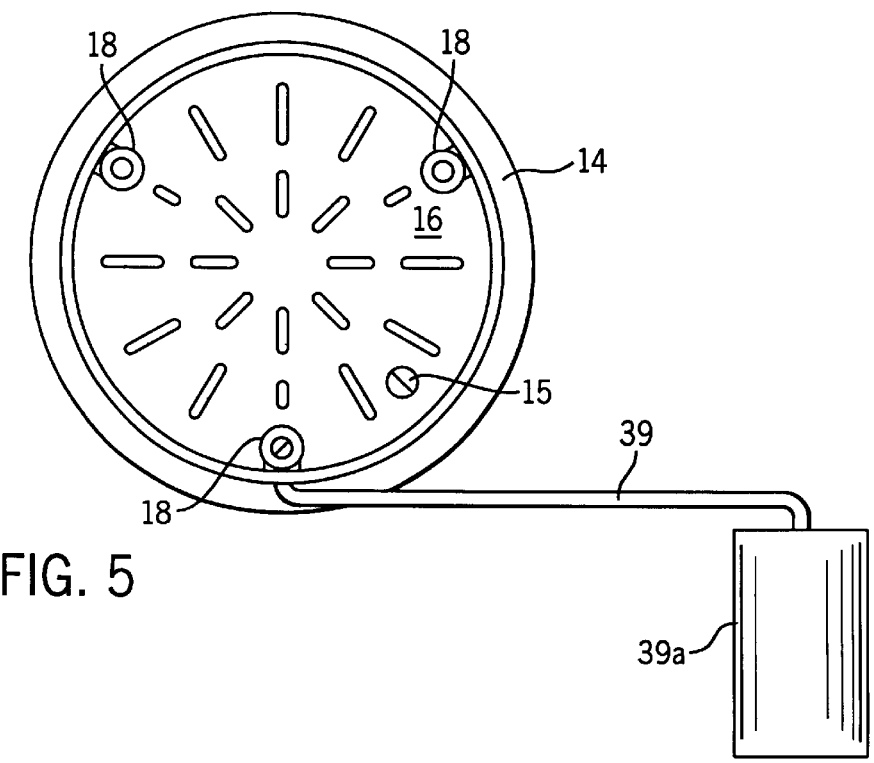
FIG. 5 is a bottom view of a fuel delivery module according to the present invention.
Figure 8:
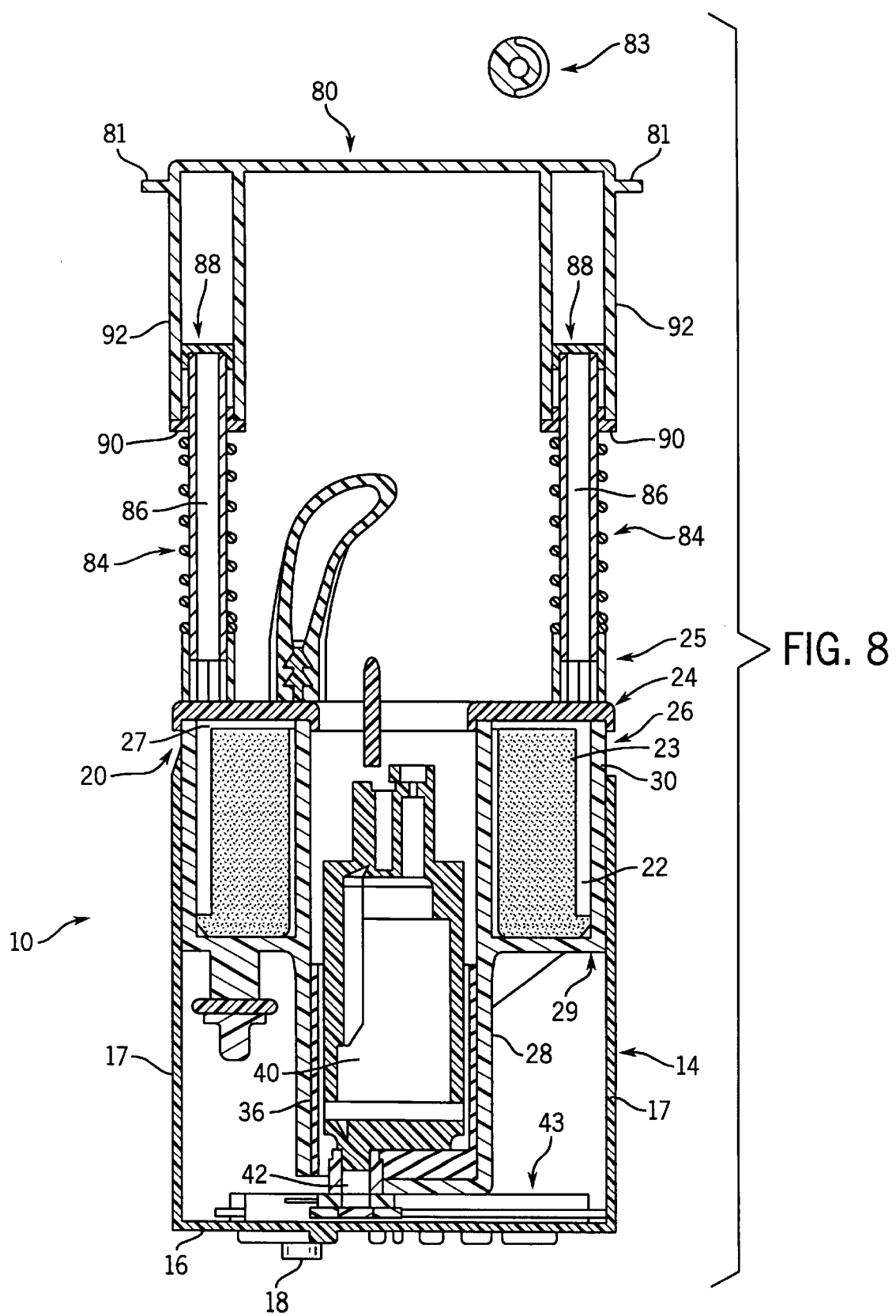
FIG. 8 is a sectional view rotated 32.5° of the fuel delivery module taken along line 8—8 of FIG. 4.

Referring now to FIGS. 2, 4 and 8, it can be seen that the fuel delivery module 10 includes a circular upper flange 80 connected to the main fuel filter cover 24 in a spaced apart relationship. The upper flange 80 includes a lip 81 at its periphery for mounting the fuel delivery module 10 in an opening 96 in the top wall 95 of the fuel tank 94. The fuel tank 94 may be formed of plastic or other material subject to deformation (buckling), due for example to thermal contraction or expansion, or the weight of the fuel in the fuel tank 94, or semi-vacuum conditions do to the withdrawal of liquid from the fuel tank 94. Such conditions can cause the open distance between the top wall 95 and the bottom wall 97 of the fuel tank 94 to vary from time to time. In order to keep the fuel reservoir 14 a constant predetermined distance above the bottom wall 97 of the fuel tank 94, the fuel delivery module 10 includes a biasing means that engages the upper flange 80 and the main fuel filter cover 24 and biases the fuel reservoir 14 against the bottom wall 97 of the fuel tank 94.

The biasing means is shown best in FIG. 8. It can be seen that the main fuel filter cover 24 includes a pair of upwardly opening tubular mounting members 25 into each of which is mounted a cylindrical connecting rod 86. The upper flange 80 includes a pair of tubular retainers 92 that extend downward from the upper flange 80. The connecting rods 86 are assembled in the tubular retainers 92 of the upper flange 80 by way of rod caps 88 that cover the end of each of the connecting rods 86 and annular plugs 90 that surround each of the connecting rods 86 and fit into the lower end of the tubular retainers 92 of the upper flange 80. A helical compression spring 84 is placed over each connecting rod 86 and engages a surface of an associated tubular mounting member 25 on the main fuel filter cover 24 and a surface of an associated annular plug 90 on the lower end of one of the tubular retainers 92 of the upper flange 80. When the upper flange 80 of the fuel delivery module 10 is mounted in the opening 96 in the top wall 95 of the fuel tank 94, the springs 84 exert a downward force on the fuel filter cover 24 whereby each connecting rod 86 moves in its associated tubular retainer 92 on the upper flange 80 until the feet 18 of the fuel reservoir 14 contact the bottom wall 97 of the fuel tank 94. During contraction or expansion of the fuel tank 94, the springs 84 continue to exert a downward force on the fuel filter cover 24 to keep the feet 18 of the fuel reservoir 14 in contact the bottom wall 97 of the fuel tank 94.

Turning now to FIGS. 4 and 6, it can be seen that an electrical connector 82 and a fuel line connector 83 are mounted on the top of the upper flange 80. The fuel line connector 83 is placed in fluid communication with the main fuel filter chamber 22 by way of a main fuel filter outlet conduit 34 that creates a fluid path between the outlet port 47 of the main fuel filter cover 24 and the fuel line connector 83. The fuel line connector 83 is also in fluid communication with an engine fuel line (not shown). The electrical connector 82 provides a convenient means to connect a source of electrical power to the fuel level sender 38 and the fuel pump 40 by way of electrical lines (not shown). Referring still to FIG. 6, it can be seen the fuel pump 40 is mounted within an open space 32 defined by the tubular section 28 of the main fuel filter body 26. The fuel pump 40 is preferably a regenerative turbine type pump. A pump isolator 36, which is preferably made of a vibration absorbent material such as rubber, is located between the tubular section 28 of the main fuel filter body 26 and the fuel pump 40, and cylindrically encloses a portion of fuel pump 40. The isolator 36 serves to reduce noise and vibration from the fuel pump 40. The fuel pump 40 has an outlet 44 and an inlet 42. The outlet 44 of the fuel pump 40 is placed in fluid communication with the main fuel filter chamber 22 by way of a fuel pump outlet conduit 45 that creates a fluid path between the inlet port 37 of the main fuel filter cover 24 and the outlet 44 of the fuel pump 40. Attached to the inlet 42 of the fuel pump 40 is a fuel pump filter 43.

Figure 7:
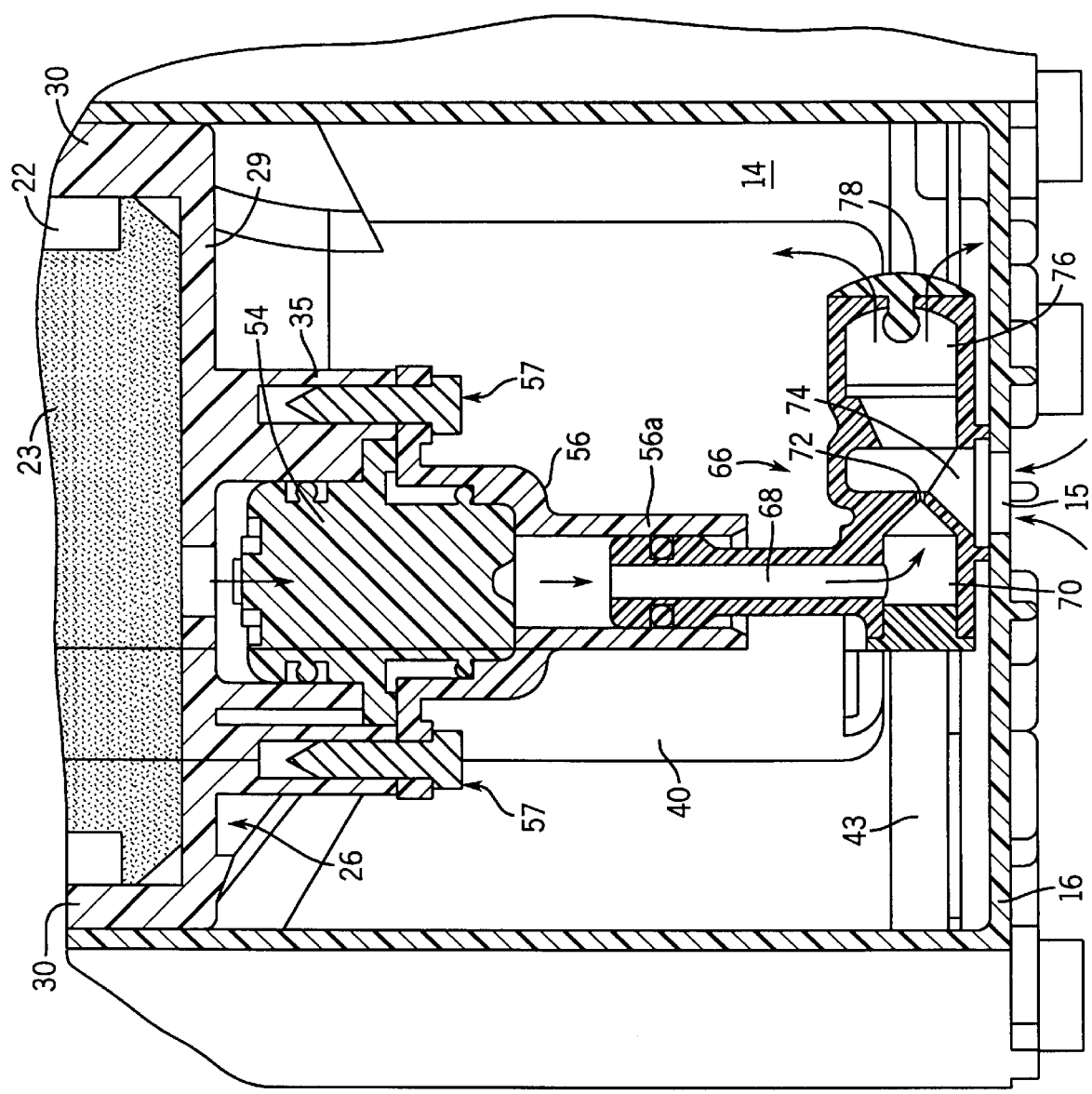
FIG. 7 is a partial sectional view rotated 45° of the fuel delivery module taken along line 7—7 of FIG. 4.

Referring now to FIG. 7, there is shown the pressure regulator 54 of the fuel delivery module 10. The pressure regulator 54 is a flow through or a bypass pressure regulator, and is assembled in an outlet port 35 at the bottom of the transverse wall 29 of the main fuel filter body 26. The pressure regulator 54 is held in placed by a retainer 56 that is secured to the outlet port 35 of the main fuel filter body 26 by fasteners 57. It can be seen a lower portion 56a of the retainer 56 defines a vertical fluid passageway.

Referring still to FIG. 7, there is also shown the jet pump 66 that provides a means for drawing fuel from fuel tank 94 to fill the fuel reservoir 14. The jet pump 66 consists of a fuel intake chamber 70 leading to a venturi opening 72 which draws fuel from fuel tank 94 into a fuel outlet chamber 74. The components of the jet pump 66 preferably are integrally molded allowing simpler manufacture. The jet pump fuel intake chamber 70 is fluidly connected to a jet pump fuel inlet conduit 68 which receives fuel from the pressure regulator 54 by way of the lower portion 56a of the retainer 56. A narrowed portion in the fuel intake chamber 70 acts as a nozzle which draws fuel from the fuel tank 94 into venturi opening 72 through an inlet orifice 15 in the bottom wall 16 of the fuel reservoir 14. Preferably, the inlet orifice 15 is covered by a filter. The combined fuel from the fuel tank 94 and the venturi opening 72 form a stream which passes into a fuel outlet chamber 74. A jet pump outlet conduit 76 is fluidly connected to the fuel outlet chamber 74 and serves to direct fuel into fuel reservoir 14. A one-way flapper valve 78 is located at an end of the jet pump outlet conduit 76 to allow fuel flow from the jet pump outlet conduit 76 into the fuel reservoir 14 while preventing fuel flow from the fuel reservoir 14 into the jet pump outlet conduit 76. The flapper valve 78 is preferably made of fluorosilicone or other fuel resistant material.

The operation of the fuel delivery module 10 is illustrated in FIGS. 6 and 7 by arrows showing the flow of fuel through the various components. Referring first to FIG. 6, the fuel pump 40 sucks fuel from the fuel reservoir 14 through the fuel pump filter 43 located at the inlet 42 of the fuel pump 40. The fuel then continues through the fuel pump 40 and exits the fuel pump 40 at the fuel pump outlet 44. The fuel then enters the fuel pump outlet conduit 45 and is routed into the main fuel filter chamber 22 by way of the inlet port 37 of the main fuel filter cover 24. The fuel is filtered in the main fuel filter chamber 22 by the main fuel filter 23 and then exits the main fuel filter chamber 22 by way of the outlet port 47 of the main fuel filter cover 24. The fuel then enters the main fuel filter outlet conduit 34 and is routed to the fuel line connector 83 which is mounted on the top of the upper flange 80. The fuel can then be supplied to the engine fuel line from the fuel line connector 83. The outlet pressure of the fuel entering the fuel line is controlled by the pressure regulator 54 as described below.

Referring now to FIG. 7, the flow of fuel through the pressure regulator 54 and the jet pump 66 is shown by arrows. Fuel enters an inlet port of the pressure regulator 54 and when the pressure regulator 54 senses that a predetermined threshold pressure has been reached in the sealed main fuel filter chamber 22, fuel exits the pressure regulator 54 through an outlet port. Fuel exiting the outlet port of the pressure regulator 54 then enters the jet pump fuel inlet conduit 68 and the jet pump fuel intake chamber 70. The fuel flows through a narrowed portion in the fuel intake chamber 70 which draws fuel from the fuel tank 94 into the venturi opening 72 through the inlet orifice 15 in the bottom wall 16 of the fuel reservoir 14. Combined fuel from the fuel tank 94 and the venturi opening 72 form a stream which passes into the fuel outlet chamber 74 of the jet pump 66. The fuel then flows through the jet pump outlet conduit 76 and the one-way flapper valve 78 and into the fuel reservoir 14.

During normal operation of the vehicle, the fuel pump 40 will create pressure within the main fuel filter chamber 22 that exceeds the threshold pressure of the pressure regulator 54. As a result, fuel will flow through the pressure regulator 54 and the jet pump 66 and fuel will be entrained from the fuel tank 94 into the fuel reservoir 14. Eventually, the fuel reservoir 14 will overflow through spaces in the main fuel filter cover 24 and into the fuel tank 94. When the vehicle turns a corner, accelerates, decelerates, or parks or drives on a sloped surface, sufficient fuel will be available to fuel pump 40 even if the fuel level in the fuel tank 94 is lower than the fuel pump inlet 42 since the fuel reservoir 14 will be filled with fuel. When vehicle operation ceases and the fuel pump 40 shuts off, a minimum level of fuel will remain in the fuel reservoir 14. This will help restart the engine when the fuel level in the fuel tank is low and/or the vehicle is parked on a slope.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the scope of the appended claims should not be limited to the description of the preferred embodiments contained herein.

What is claimed is:

1. A returnless fuel delivery module for supplying fuel to an engine from a fuel tank, the fuel delivery module comprising:
    a fuel reservoir;
    a sealed filter housing defining a main fuel filter chamber, the main fuel filter chamber containing a main fuel filter, the filter housing being mounted to the fuel reservoir;
    a fuel pump located within the fuel reservoir for pumping fuel from the fuel reservoir;
    a fuel pump outlet conduit in fluid communication with an outlet of the fuel pump and the main fuel filter chamber for routing fuel from the fuel pump to the main fuel filter chamber;
    a filter housing outlet conduit in fluid communication with the main fuel filter chamber and a fuel line for routing fuel from the main fuel filter chamber to the engine;
    a pressure regulator in fluid communication with the main fuel filter chamber and a jet pump fuel inlet conduit, the pressure regulator suitable for routing a portion of fuel from the main fuel filter chamber and to the jet pump fuel inlet conduit when a threshold pressure is reached in the main fuel filter chamber; and
    a jet pump located within the fuel reservoir, the jet pump having a fuel intake chamber in fluid communication with the jet pump fuel inlet conduit for receiving the portion of fuel from the main fuel filter chamber and routing the portion of fuel past a venturi opening to draw fuel from the fuel tank through an inlet orifice in a wall of the fuel reservoir into a jet pump fuel outlet chamber and through a jet pump outlet conduit into the fuel reservoir, the jet pump outlet conduit including a one-way valve which allows fuel flow from the jet pump outlet conduit into the fuel reservoir while preventing fuel flow from the fuel reservoir into the jet pump outlet conduit.

2. The fuel delivery module of claim 1 wherein the filter housing comprises:
    a filter body mounted in an upwardly facing opening in the fuel reservoir, and
    a filter cover for sealing an upwardly facing opening in the filter body, the filter body and the filter cover defining the main fuel filter chamber.

3. The fuel delivery module of claim 2 further comprising:
    an upper flange for sealingly engaging an opening in a top wall of the fuel tank, the upper flange being connected to the filter cover.

4. The fuel delivery module of claim 3 further comprising:
    an electrical connector mounted in the upper flange, the electrical connector being electrically connected to the fuel pump.

5. The fuel delivery module of claim 3 further comprising:
    biasing means engaging the upper flange and the filter cover, the biasing means biasing the fuel reservoir against a bottom wall of the fuel tank.

6. The fuel delivery module of claim 5 wherein the biasing means comprises:
    at least one connecting rod connected to the filter cover and slidably mounted in a retainer in the upper flange, and
    at least one spring that engages the upper flange and the filter cover for biasing the fuel reservoir against the bottom wall of the fuel tank.

7. The fuel delivery module of claim 2 wherein:
    the filter body and the filter cover are dimensioned to form an open space in an interior portion of the filter housing, and
    at least a portion of the fuel pump is located within the open space in the interior portion of the filter housing.

8. The fuel delivery module of claim 7 wherein:
    the portion of the fuel pump located within the open space is surrounded by an isolator for isolating the fuel pump from the filter housing.

9. The fuel delivery module of claim 2 wherein:
    the pressure regulator is mounted to an outlet port located on a transverse wall of the filter body.

10. The fuel delivery module of claim 1 further comprising:
    a fuel level sender for sensing fuel level in the fuel tank, the fuel level sender being attached to the filter cover.

11. The fuel delivery module of claim 1 wherein the one-way valve comprises a flapper valve.

12. The fuel delivery module of claim 1 further comprising:
    a fuel pump filter attached to an inlet of the fuel pump.

13. A returnless fuel delivery module for supplying fuel to an engine from a fuel tank, the fuel delivery module comprising:
    a fuel reservoir;
    a sealed filter housing including a filter body mounted in an upwardly facing opening in the fuel reservoir and a filter cover for sealing an upwardly facing opening in the filter body, the filter body and the filter cover defining a main fuel filter chamber, the main fuel filter chamber containing a main fuel filter;

an upper flange for sealingly engaging an opening in a top wall of the fuel tank, the upper flange being connected to the filter cover;

a fuel pump located within the fuel reservoir for pumping fuel from the fuel reservoir;

a fuel pump outlet conduit in fluid communication with an outlet of the fuel pump and the main fuel filter chamber for routing fuel from the fuel pump to the main fuel filter chamber;

a filter housing outlet conduit in fluid communication with the main fuel filter chamber and a fuel line for routing fuel from the main fuel filter chamber to the engine;

a pressure regulator in fluid communication with the main fuel filter chamber and a jet pump fuel inlet conduit, the pressure regulator being mounted to an outlet port located on a transverse wall of the filter body, the pressure regulator suitable for routing a portion of fuel from the main fuel filter chamber and to the jet pump fuel inlet conduit when a threshold pressure is reached in the main fuel filter chamber; and a jet pump located within the fuel reservoir, the jet pump having a fuel intake chamber in fluid communication with the jet pump fuel inlet conduit for receiving the portion of fuel from the main fuel filter chamber and routing the portion of fuel past a venturi opening to draw fuel from the fuel tank through an inlet orifice in a wall of the fuel reservoir into a jet pump fuel outlet chamber and through a jet pump outlet conduit into the fuel reservoir, the jet pump outlet conduit including a one-way valve which allows fuel flow from the jet pump outlet conduit into the fuel reservoir while preventing fuel flow from the fuel reservoir into the jet pump outlet conduit.

14. The fuel delivery module of claim 13 further comprising:

a fuel pump filter attached to an inlet of the fuel pump.

15. The fuel delivery module of claim 14 further comprising:

biasing means engaging the upper flange and the filter cover, the biasing means biasing the fuel reservoir against a bottom wall of the fuel tank.

16. The fuel delivery module of claim 15 further comprising:

a fuel level sender for sensing fuel level in the fuel tank, the fuel level sender being attached to the filter cover.

17. A returnless fuel delivery module for supplying fuel to an engine from a fuel tank, the fuel delivery module comprising:

a fuel reservoir;

a sealed filter housing including a filter body mounted in an upwardly facing opening in the fuel reservoir and a filter cover for sealing an upwardly facing opening in the filter body, the filter body and the filter cover being dimensioned to form an open space in an interior portion of the filter housing, the filter body and the filter cover defining a main fuel filter chamber, the main fuel filter chamber containing a main fuel filter;

an upper flange for sealingly engaging an opening in a top wall of the fuel tank, the upper flange being connected to the filter cover;

a fuel pump located within the fuel reservoir for pumping fuel from the fuel reservoir, at least a portion of the fuel pump being located within the open space in the interior portion of the filter housing;

a fuel pump outlet conduit in fluid communication with an outlet of the fuel pump and the main fuel filter chamber for routing fuel from the fuel pump to the main fuel filter chamber;

a filter housing outlet conduit in fluid communication with the main fuel filter chamber and a fuel line for routing fuel from the main fuel filter chamber to the engine;

a pressure regulator in fluid communication with the main fuel filter chamber and a jet pump fuel inlet conduit, the pressure regulator being mounted to an outlet port located on a transverse wall of the filter body, the pressure regulator suitable for routing a portion of fuel from the main fuel filter chamber and to the jet pump fuel inlet conduit when a threshold pressure is reached in the main fuel filter chamber; and a jet pump located within the fuel reservoir, the jet pump having a fuel intake chamber in fluid communication with the jet pump fuel inlet conduit for receiving the portion of fuel from the main fuel filter chamber and routing the portion of fuel past a venturi opening to draw fuel from the fuel tank through an inlet orifice in a wall of the fuel reservoir into a jet pump fuel outlet chamber and through a jet pump outlet conduit into the fuel reservoir, the jet pump outlet conduit including a one-way valve which allows fuel flow from the jet pump outlet conduit into the fuel reservoir while preventing fuel flow from the fuel reservoir into the jet pump outlet conduit.

18. The fuel delivery module of claim 17 wherein:

a fuel pump filter attached to an inlet of the fuel pump.

19. The fuel delivery module of claim 18 further comprising:

biasing means engaging the upper flange and the filter cover, the biasing means biasing the fuel reservoir against a bottom wall of the fuel tank.

20. The fuel delivery module of claim 19 further comprising:

a fuel level sender for sensing fuel level in the fuel tank, the fuel level sender being attached to the filter cover.

* * * * *